Dec. 25, 1951     W. P. SCHMITTER     2,579,869
CHANGE SPEED TRANSMISSION
Filed Feb. 12, 1949     2 SHEETS—SHEET 1
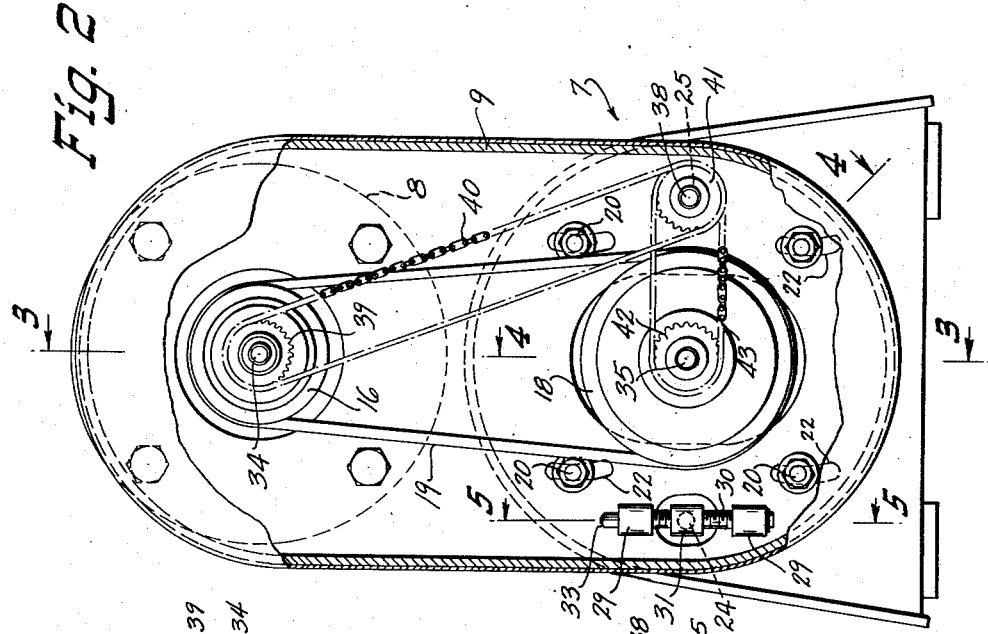
INVENTOR.
Walter P. Schmitter
BY
Quarles & French
Attorneys Dec. 25, 1951  W. P. SCHMITTER  2,579,869
CHANGE SPEED TRANSMISSION
Filed Feb. 12, 1949  2 SHEETS—SHEET 2
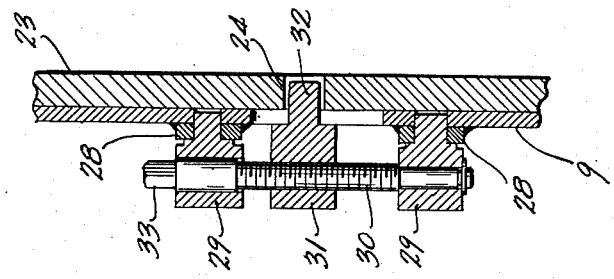
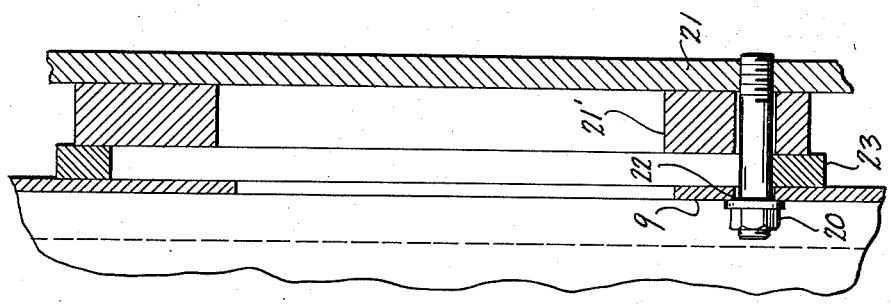
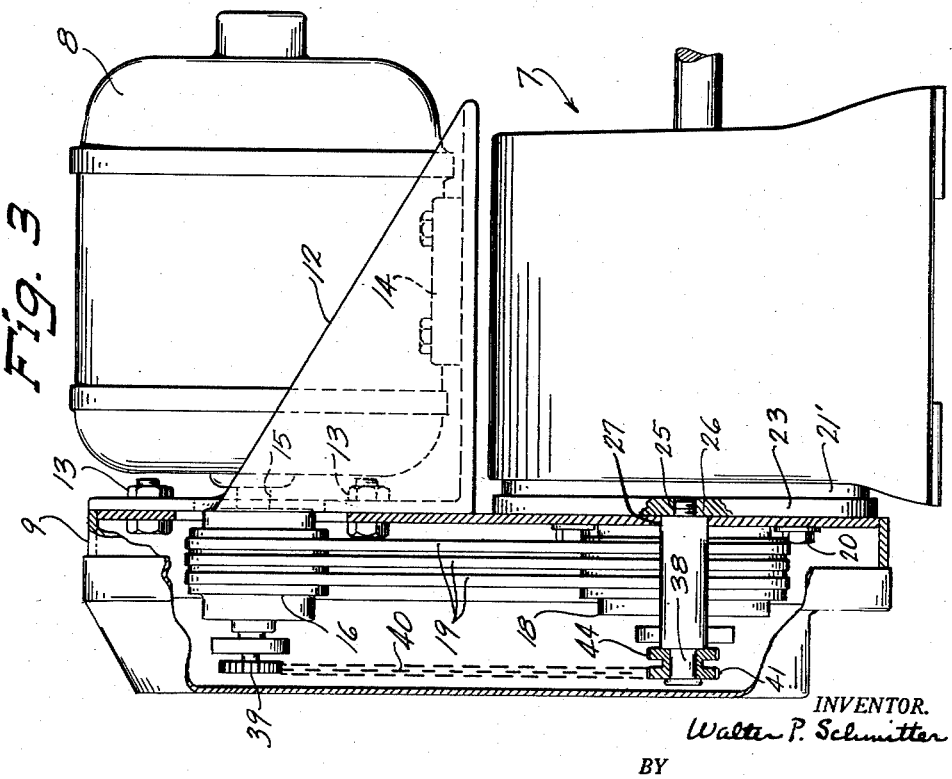
INVENTOR.
Walter P. Schmitter
BY
Quarles & French
Attorneys Patented Dec. 25, 1951

2,579,869

UNITED STATES PATENT OFFICE 2,579,869

CHANGE-SPEED TRANSMISSION

Walter Paul Schmitter, Wauwatosa, Wis., assignor to The Falk Corporation, Milwaukee, Wis., a corporation of Wisconsin Application February 12, 1949, Serial No. 76,030

4 Claims. (Cl. 74—242.13)

1

The invention relates to power transmissions and more particularly to change speed belt drive power transmissions.

One object of the invention is to provide a simple arrangement for adjusting the tension of the belt connecting the drive and driven units by the proper adjustment of a single jack screw.

A further object of the invention is to provide an arrangement whereby the variable spacing of the pulley elements of the drive and driven members may be accomplished by simultaneously changing the spacing of said elements through rotatable adjusting shafts connected together by chain drives whose distance between centers remain constant even though the distance between centers of the drive and driven units is varied.

The invention further consists in the several features hereinafter set forth and more particularly defined by claims at the conclusion hereof.

In the drawings:

Fig. 1 is a side elevation view of a power transmission embodying the invention, parts being broken away and parts being shown in section;

Fig. 2 is a front elevation view of the transmission, parts being broken away and parts being shown in section;

Fig. 3 is a side elevation view, parts being shown in a section taken generally along the line 3—3 of Fig. 2 and showing certain modifications in the motor mounting;

Fig. 4 is a vertical sectional view taken along the broken line 4—4 of Fig. 2;

Fig. 5 is a detailed vertical sectional view taken on the line 5—5 of Fig. 2.

Referring to the drawings, the numeral 7 designates generally a driven unit and 8 the drive motor. These parts are operatively connected together by a belt housing frame 9 which forms the support for the motor 8 and may be considered as part of the drive unit.

As shown in Fig. 1, the motor 8 has one of its end bells 10 secured to the frame 9 by bolts 11. In Fig. 3 the frame 9 has an angled base plate 12 secured thereto by bolts 13 and the motor has base flanges 14 bolted to the plate 12. In either case the motor 8 is suspended above the driven unit by an adjustable connection of the frame 9 with said unit.

The shaft 15 of the motor 8 carries a multiple adjustable groove V-belt pulley 16, and the shaft 17 suitably mounted in bearings of the driven unit 7 carries a multiple adjustable groove V-belt pulley 18. Adjustable groove V-belt pulleys are old per se and embody pairs of groove form-

2 ing elements, one element of each pair being adjustable relative to the other to vary the distance between said elements and hence the radial point at which the V-belt contacts the groove so as to vary the drive ratio between the drive pulleys. The pulleys 16 and 18 are operatively connected together by belts 19 mounted in alined grooves of said pulleys.

The adjustable connection between the frame 9 and the driven unit permits moving the units toward or away from each other to accommodate the adjustment of the pulleys and permit the tensioning of the belts 19. This connection includes four studs provided with nuts 20 equidistantly radially spaced from the center of the driven shaft 17 and anchored in a part 21 of the frame of the driven unit and extending through arcuate slots 22 in the frame 9. Encircling these bolts is a turnable ring 23 which has a hole 24 on its horizontal axis and a threaded hole 25 diametrically opposite the hole 24 in which a bolt 26 is anchored, said bolt passing through a hole 27 in the frame 9 so that said frame may swing slightly about the bolt 26 in the changing of its position. The ring 23 is spaced from the part 21 by a spacer ring 21'. Mounted on the housing or frame 9 are apertured bosses 28 adapted to fixedly receive apertured journal bearings and supports 29 for a threaded adjusting jack screw 30 whose threaded portion engages the threaded bore of a nut 31 which has a projection 32 engaging loosely in the hole 24. Since the jack screw 30 is mounted directly on the frame 9 and carries the nut 31 whose projection 32 engages the ring 23, movement of the nut 31 along the screw 30 will rotate or turn said ring relative to the fixed unit 7. With this arrangement on a slight loosening of the nuts 20 turning of the squared end 33 of the jack screw 30 to move the nut 31 to exert a downward thrust on the ring 23 turns the same and moves the bolt 26 up from the position shown in Fig. 2 and consequently through the contact of said bolt 26 with the frame 9 moves this side of the frame 9 up with it. At the same time when the frame moves up on the bolt side 26, the distance of the nut 31 from the upper support 29 is increased, thus moving the other side of the frame up an amount corresponding to the movement of said frame by said ring. This upward movement of the frame 9 is caused by the upward reaction thrust exerted by the jack screw 30 on the support 29 carried by said frame. Turning of the screw 30 to move the nut 31 to exert an upward thrust on the ring 23 turns the same and moves the bolt 26 down from the position shown in Fig. 2 and consequently through the contact of the bolt 26 with the frame 9 moves this side of the frame down while the distance of the nut 31 from the lower support 29 is increased, thus moving this side of the frame downwardly an amount corresponding to the downward movement of said frame by said ring. This downward movement of the frame 9 is caused by the downward reaction thrust exerted by the jack screw 30 on the support 29 carried by said frame. Thus by the direct connection of the jack screw 30 with one side of the frame 9 and its indirect connection with the other side of said frame through the nut 31 and the ring 23 which carries the bolt 26 mounted in the hole 27 in the frame 9 turning of the screw 30 moves the frame 9 up or down to vary the distance between the drive shaft 15 and the driven shaft 17. After the desired adjustment has been obtained, the nuts 20 are tightened up to maintain the adjustment.

The adjustable elements of V-belt pulleys 16 and 18 are in known manner moved to their adjusted positions by rotatable operating shafts 34 and 35, and in order that these shafts may be turned simultaneously they are geared or operatively connected together by chain and sprocket gearing, and in order that this gearing may comprise chains of fixed length the shafts 34 and 35 are connected by chain gearing with a shaft extension 38 of the bolt 26. As shown the shaft 34 carries a sprocket 39 connected by a chain 40 with a sprocket 41 journalled on the extension 38 while the shaft 35 carries a sprocket 42 connected by a chain 43 with a sprocket 44 integral with or connected to the sprocket 41 so that by turning the shaft 34 by a removable hand crank the shafts 34, 38 and 35 are turned simultaneously through the chain and sprocket gearing above described to adjust the adjustable elements of the V-belt pulleys 16 and 18. In this connection it will be noted that since the shaft extension 38 is mounted on the ring 23 which has the same axis or center as the shaft 15 its distance does not change when the ring 23 is turned to move the bolt 26 with said shaft 38 up or down as previously described, and since the bolt 26 moves up or down the same amount that the frame 9 carrying the shaft 17 moves up or down, the distance between the shaft 17 and the shaft extension 38 does not change. Thus the anchoring of the support for the sprockets 41 and 44 on the ring keeps the lengths of the drive connections for the pulley adjustments constant and thus simplifies the construction.

While the adjustable feature above described is especially desirable for adjustable V-belt pulleys, it is to be noted that it may be used with transmissions having non-adjustable pulleys and that other changes may be made without departing from the invention which is not to be limited to the specific details hereinbefore described except as such limitations are included in the appended claims.

What I claim as my invention is:

1. In a change speed transmission having a drive unit and a driven unit and a belt drive connection between said units, one of said units being a movable unit having an adjustable supporting mounting on the other fixed unit, mechanism for moving said units relative to each other to adjust the tension of said belts comprising a member rotatably mounted on said fixed unit and directly connected to one side of said supporting unit for movement of this side of said unit, and manually adjustable means on the other side of said supporting unit indirectly connected to said member for moving said member and this side of said unit.

2. In a change speed transmission having a drive unit and a driven unit and a belt drive connection between said units, one of said units having an adjustable supporting mounting on the other unit, mechanism for moving said units relative to each other to adjust the tension of said belts comprising a jack screw carried by said supporting mounting at one side thereof, a member rotatably mounted on said other unit, a nut engaging said jack screw and operatively connected with said member to angularly shift the same, and a member carried by said rotatable member and on the opposite side thereof from the nut and having a load supporting connection with the other side of said mounting.

3. The structure as defined in claim 2 wherein the rotatable member is a ring mounted to rotate on spaced guides for said supporting mounting.

4. The structure as defined in claim 2 wherein the rotatable member is a ring mounted on studs secured to said other unit and forming guides extending through slots in the supporting mounting.

WALTER PAUL SCHMITTER.

REFERENCES CITED

The following references are of record in the file of this patent:

UNITED STATES PATENTS

| Number | Name | Date |
| --- | --- | --- |
| 1,353,986 | Bergendorf | Sept. 28, 1920 |
| 1,482,013 | Jarvis et al. | Jan. 29, 1924 |
| 1,488,617 | Robinson | Apr. 1, 1924 |